US009180858B2

(12) United States Patent
Aoki et al.

(10) Patent No.: US 9,180,858 B2
(45) Date of Patent: Nov. 10, 2015

(54) HYBRID DRIVE DEVICE

(71) Applicants: AISIN AW CO., LTD., Anjo-shi, Aichi-ken (JP); AISIN SEIKI KABUSHIKI KAISHA, Kariya-shi, Aichi-ken (JP)

(72) Inventors: Hidetoshi Aoki, Anjo (JP); Takafumi Koshida, Okazaki (JP); Yoshitomi Haneda, Anjo (JP); Tokiyoshi Kida, Nagoya (JP); Hiroshi Imai, Nisshin (JP)

(73) Assignees: AISIN AW CO., LTD., Anjo (JP); AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 14/368,211

(22) PCT Filed: Jan. 24, 2013

(86) PCT No.: PCT/JP2013/051500
§ 371 (c)(1),
(2) Date: Jun. 23, 2014

(87) PCT Pub. No.: WO2013/128992
PCT Pub. Date: Sep. 6, 2013

(65) Prior Publication Data
US 2014/0360793 A1    Dec. 11, 2014

(30) Foreign Application Priority Data

Feb. 29, 2012    (JP) ................................. 2012-044855

(51) Int. Cl.
*B60W 10/02*    (2006.01)
*B60K 6/445*    (2007.10)
(Continued)

(52) U.S. Cl.
CPC ................ *B60W 10/02* (2013.01); *B60K 6/387* (2013.01); *B60K 6/442* (2013.01); *B60K 6/445* (2013.01);
(Continued)

(58) Field of Classification Search
CPC ....... B60W 10/02; B60K 6/442; B60K 6/387; Y10S 903/946
USPC .............................. 180/65.275, 65.265, 65.23
See application file for complete search history.

(56) References Cited

U.S. PATENT DOCUMENTS 5,222,570 A * 6/1993 Kawamura et al. ........... 180/197
5,732,380 A * 3/1998 Iwata ............................. 701/85
(Continued)

FOREIGN PATENT DOCUMENTS

| JP | A-2004-249943 | 9/2004 |
| JP | A-2006-16186 | 2/2006 |

(Continued)

OTHER PUBLICATIONS

International Search Report issued in International Patent Application No. PCT/JP2013/051500 dated Feb. 26, 2013.

*Primary Examiner* — John Walters
*Assistant Examiner* — Brian Swenson
(74) *Attorney, Agent, or Firm* — Oliff PLC

(57) ABSTRACT

A hybrid drive device in which an input shaft is connected to an engine, an output shaft is connected to wheels, and a wheel drive motor is connected between the input shaft and the output shaft. In the hybrid device, a friction engagement element that is provided between the input shaft and the output shaft and of which transfer torque is controllable. A control device controls the friction engagement element. The control device reduces the transfer torque of the friction engagement element during engine starting in a predetermined low temperature environment or during travel on a bad road, compared to the transfer torque of the friction engagement element in an engaged state.

5 Claims, 9 Drawing Sheets

(51) Int. Cl.
  *B60L 11/14* (2006.01)
  *B60W 10/06* (2006.01)
  *B60W 10/08* (2006.01)
  *B60W 20/00* (2006.01)
  *B60L 11/12* (2006.01)
  *B60L 15/20* (2006.01)
  *B60W 30/194* (2012.01)
  *B60K 6/387* (2007.10)
  *B60K 6/442* (2007.10)
  *B60K 6/543* (2007.10)

(52) U.S. Cl.
  CPC ............... *B60K 6/543* (2013.01); *B60L 11/123* (2013.01); *B60L 11/14* (2013.01); *B60L 15/20* (2013.01); *B60W 10/06* (2013.01); *B60W 10/08* (2013.01); *B60W 20/00* (2013.01); *B60W 20/20* (2013.01); *B60W 30/194* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/461* (2013.01); *B60L 2240/486* (2013.01); *B60L 2240/50* (2013.01); *B60L 2240/507* (2013.01); *B60L 2240/549* (2013.01); *B60L 2240/647* (2013.01); *B60L 2240/662* (2013.01); *B60W 2710/027* (2013.01); *Y02T 10/6217* (2013.01); *Y02T 10/6239* (2013.01); *Y02T 10/6286* (2013.01); *Y02T 10/642* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01); *Y10S 903/946* (2013.01)

(56) References Cited

U.S. PATENT DOCUMENTS

| | | | |
|---|---|---|---|
| 6,295,487 B1 * | 9/2001 | Ono et al. | 701/22 |
| 7,158,873 B2 * | 1/2007 | Eich et al. | 701/68 |
| 7,896,114 B2 * | 3/2011 | Colvin et al. | 180/65.28 |
| 8,142,328 B2 * | 3/2012 | Reuschel | 477/6 |
| 8,634,994 B2 * | 1/2014 | Monsere et al. | 701/51 |
| 8,700,241 B2 * | 4/2014 | Yoshimura | 701/22 |
| 8,712,616 B2 * | 4/2014 | Treharne et al. | 701/22 |
| 2003/0019674 A1 * | 1/2003 | Duan | 180/65.3 |
| 2012/0203416 A1 * | 8/2012 | Yoshimura | 701/22 |

FOREIGN PATENT DOCUMENTS

| | | |
|---|---|---|
| JP | A-2006-194326 | 7/2006 |
| JP | A-2007-99141 | 4/2007 |
| JP | A-2008-231953 | 10/2008 |
| JP | A-2011-37331 | 2/2011 |
| JP | A-2011-156899 | 8/2011 |
| JP | A-2011-208758 | 10/2011 |

* cited by examiner

HYBRID DRIVE DEVICE

TECHNICAL FIELD

The present disclosure relates to a hybrid drive device that includes a friction engagement element provided between an input shaft and an output shaft.

BACKGROUND ART

There has hitherto been known a hybrid drive device of this type (see Patent Document 1, for example). In the configuration disclosed in Patent Document 1, a friction engagement element (torque limiter) of fixed transfer torque is provided between an input shaft and an output shaft. The torque limiter functions to protect various portions of a drive transfer mechanism of the hybrid drive device from excessively large torque by slipping when torque that is equal to or more than predetermined torque (upper-limit torque) is transferred to the drive transfer mechanism so that torque that is equal to or more than the predetermined torque is not transferred to the various portions of the drive transfer mechanism.

RELATED-ART DOCUMENTS

Patent Documents

[Patent Document 1] Japanese Patent Application Publication No. 2011-208758 (JP 2011-208758 A)

SUMMARY OF THE INVENTION

Problem to be Solved by the Invention

In the configuration disclosed in Patent Document 1, a friction engagement element of fixed transfer torque is used. However, upper-limit torque of such a friction engagement element, at which the friction engagement element starts slipping, may be fluctuated. Thus, it is necessary that the various portions (built-in parts) of the drive transfer mechanism should be designed in consideration of such fluctuations in the upper-limit torque. This is a cause of increases in size and weight of the drive transfer mechanism to incur a problem of a reduction in fuel efficiency of a hybrid vehicle.

In view of the foregoing, it is an object of the present disclosure to provide a hybrid drive device capable of preventing increases in size and weight of a drive transfer mechanism to prevent a reduction in fuel efficiency of a hybrid vehicle.

Means for Solving the Problem

An aspect of the present disclosure provides a hybrid drive device in which an input shaft is connected to an engine, an output shaft is connected to wheels, and a wheel drive motor is connected between the input shaft and the output shaft, characterized by including:

a friction engagement element that is provided between the input shaft and the output shaft and of which transfer torque is controllable; and a control device that controls the friction engagement element, in which the control device reduces the transfer torque of the friction engagement element under a predetermined condition.

Effects of the Invention

According to the present disclosure, it is possible to provide a hybrid drive device capable of preventing increases in size and weight of a drive transfer mechanism to prevent a reduction in fuel efficiency of a hybrid vehicle.

MODES FOR CARRYING OUT THE INVENTION

Various embodiments will be described in detail below with reference to the accompanying drawings.

Figure 1:
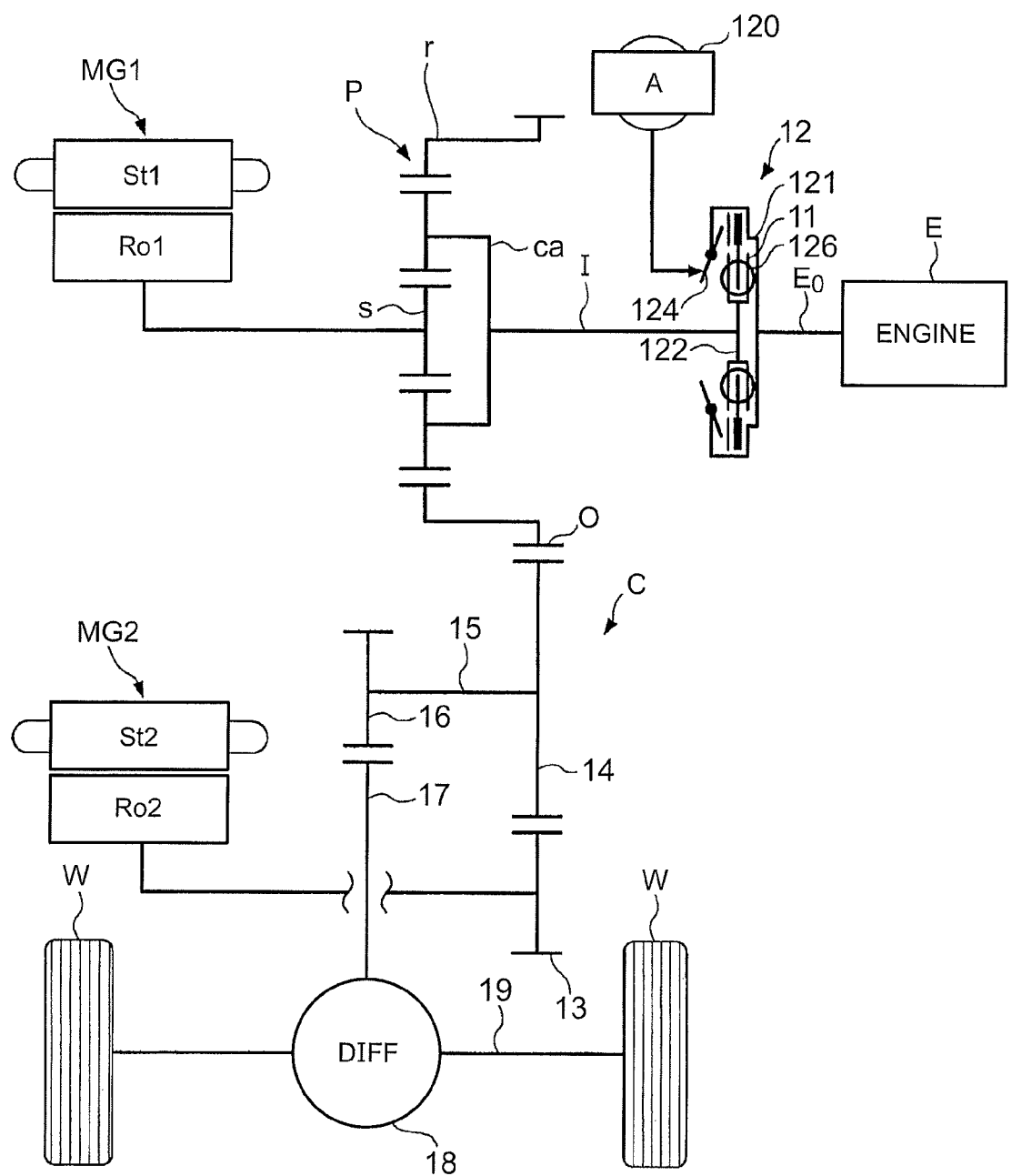
FIG. 1 is a skeleton diagram illustrating the configuration of a hybrid drive device 1 according to an embodiment (first embodiment) of the present invention.
Figure 2:
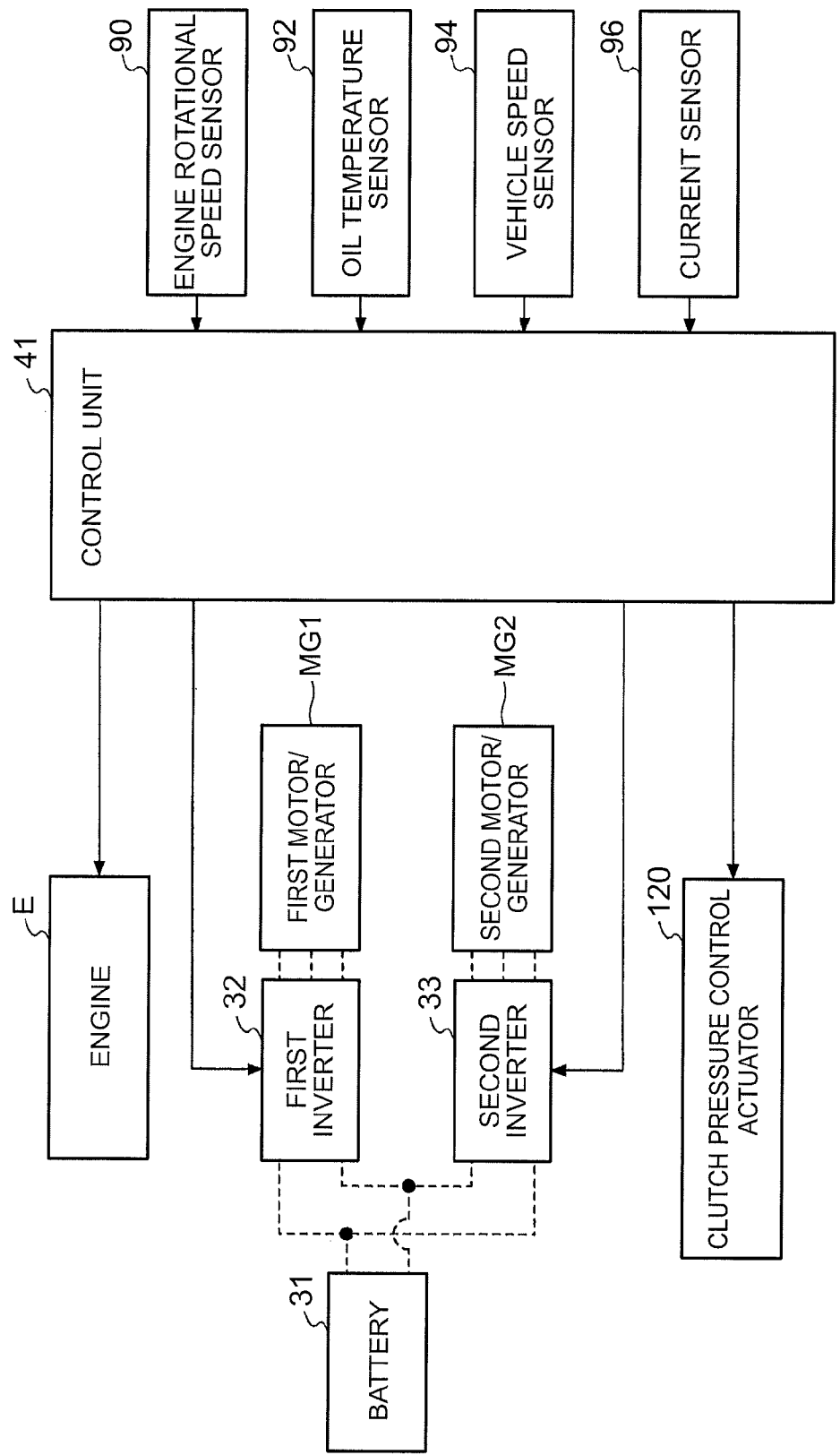
FIG. 2 is a schematic diagram illustrating the system configuration of the hybrid drive device 1.

FIG. 1 is a skeleton diagram illustrating the configuration of a hybrid drive device 1 according to an embodiment (first embodiment) of the present invention. FIG. 2 is a schematic diagram illustrating the system configuration of the hybrid drive device 1. In FIG. 2, solid arrows each indicate a transfer path for various types of information, and broken lines each indicate a transfer path for electric power. A hybrid vehicle on which the hybrid drive device 1 is mounted may be a plug-in hybrid vehicle that can be charged from the outside, or may be a normal hybrid vehicle.

As illustrated in FIGS. 1 and 2, the hybrid drive device 1 includes an input shaft I connected to an engine E, a clutch 12, a first motor/generator MG1, a second motor/generator MG2, an output gear O connected to wheels W via a counter speed reduction mechanism C and an output differential gear device 18, a planetary gear device P, the counter speed reduction mechanism C, the output differential gear device 18, and a control unit 41 that controls the first motor/generator MG1, the second motor/generator MG2, and so forth. Here, the planetary gear device P has three rotary elements, namely a first rotary element connected to the first motor/generator MG1, a second rotary element connected to the input shaft I, and a third rotary element connected to the output gear O and the second motor/generator MG2. In addition, the input shaft I is connected to the engine E via the clutch 12.

Here, first, the mechanical configuration of various portions of the hybrid drive device 1 will be described. As illustrated in FIG. 1, the input shaft I is connected to the engine E. Here, the engine E is an internal combustion engine driven by combustion of fuel, and may be any engine such as a gasoline engine or a diesel engine, for example. In the example, the input shaft I is connected to an engine output shaft Eo such as a crankshaft of the engine E via the clutch 12. In addition, the input shaft I is connected to a carrier ca of the planetary gear device P.

The clutch 12 may be a clutch of any type, and transfer torque thereof can be electronically controlled. In the illustrated example, transfer torque (friction torque) of the clutch 12 is varied by driving an electric actuator 120 (hereinafter referred to as a "clutch pressure control actuator 120") under control by the control unit 41 (see FIG. 2). In the example illustrated in FIG. 1, the clutch 12 is a dry single-plate clutch, and includes a clutch cover (input element) 121 and a clutch disk (output element) 122. The clutch cover 121 is connected to the engine output shaft Eo of the engine E, and the clutch disk 122 is connected to the input shaft I via a damper 126. The clutch disk 122 is urged by a spring (not illustrated) to be engaged with the clutch cover 121 at normal times. The urging force of the spring is adjusted in accordance with the rotational position of a lever 124. That is, the clutch pressure control actuator 120 drives the lever 124 to vary transfer torque between the clutch cover 121 and the clutch disk 122. A drive mechanism for the lever 124 may be determined as desired. For example, a mechanism including a worm and a worm wheel may be utilized.

The first motor/generator MG1 includes a first stator St1 fixed to a case (not illustrated), and a first rotor Ro1 supported on the radially inner side of the first stator St1 so as to be freely rotatable. The first motor/generator MG1 is disposed coaxially with the input shaft I on the radially outer side of the input shaft I on the side opposite to the engine E with respect to the planetary gear device P. That is, in the example, the engine E, the planetary gear device P, and the first motor/generator MG1 are disposed coaxially in this order from the side of the engine E. The first rotor Ro1 of the first motor/generator MG1 is connected so as to rotate together with a sun gear s of the planetary gear device P. In addition, the second motor/generator MG2 includes a second stator St2 fixed to the case (not illustrated), and a second rotor Ro2 supported on the radially inner side of the second stator St2 so as to be freely rotatable. The second rotor Ro2 of the second motor/generator MG2 is connected so as to rotate together with a second motor/generator output gear 13. As illustrated in FIG. 2, the first motor/generator MG1 and the second motor/generator MG2 are electrically connected to a battery 31 that serves as an electricity accumulation device via a first inverter 32 and a second inverter 33, respectively. Each of the first motor/generator MG1 and the second motor/generator MG2 can function both as a motor (electric motor) that is supplied with electric power to generate power and as a generator (electric generator) that is supplied with power to generate electric power.

Each of the first motor/generator MG1 and the second motor/generator MG2 functions as one of a generator and a motor in accordance with the relationship between the rotational direction and the direction of the rotational drive force. When functioning as a generator, the first motor/generator MG1 or the second motor/generator MG2 supplies generated electric power to the battery 31 to charge the battery 31, or supplies generated electric power to the other motor/generator MG1 or MG2 functioning as a motor to cause the motor/generator to perform power running. When functioning as a motor, meanwhile, the first motor/generator MG1 or the second motor/generator MG2 is supplied with electric power charged in the battery 31 or generated by the other motor/generator MG1 or MG2 functioning as a generator to perform power running. Operation of the first motor/generator MG1 is performed via the first inverter 32 in accordance with a control command from the control unit 41. Operation of the second motor/generator MG2 is performed via the second inverter 33 in accordance with a control command from the control unit 41.

In the illustrated example, the planetary gear device P is a single-pinion planetary gear mechanism disposed coaxially with the input shaft I. That is, the planetary gear device P includes as its rotary elements the carrier ca which supports a plurality of pinion gears, and the sun gear s and a ring gear r each meshed with the pinion gears. The sun gear s is connected so as to rotate together with a rotary shaft of the first rotor Ro1 of the first motor/generator MG1. The carrier ca is connected so as to rotate together with the input shaft I. The ring gear r is connected so as to rotate together with the output gear O. In the illustrated example, the sun gear s, the carrier ca, and the ring gear r correspond to the "first rotary element", the "second rotary element", and the "third rotary element", respectively.

The output gear O is disposed coaxially with the input shaft I on the downstream side of the planetary gear device P on a power transfer path. In the illustrated example, the output gear O is disposed coaxially with the input shaft I on the radially outer side of the input shaft I on the side of the engine E with respect to the planetary gear device P. The output gear O is meshed with a first gear 14 of the counter speed reduction mechanism C to be discussed later. This enables the rotational drive force transferred to the output gear O to be transferred to the wheels W via the counter speed reduction mechanism C, the output differential gear device 18, and an output shaft 19. The second motor/generator output gear 13 is also meshed with the first gear 14. This also enables the rotational drive force of the second motor/generator MG2 to be transferred to the wheels W via the counter speed reduction mechanism C, the output differential gear device 18, and the output shaft 19.

The counter speed reduction mechanism C includes the first gear 14 meshed with the output gear O, a second gear 16 meshed with a differential input gear 17, and a counter shaft 15 that couples the first gear 14 and the second gear 16 to each other. The second gear 16 may be set to have a small diameter and a small number of teeth compared to the first gear 14. In this case, rotation of the first gear 14 is transferred to the second gear 16 while reduced in speed in terms of the number of teeth. In addition, the second motor/generator output gear 13 is meshed with the first gear 14. That is, the output gear O and the second motor/generator output gear 13 are meshed with the first gear 14 at the same time. Thus, the rotational drive force of the output gear O and the rotational drive force of the second motor/generator output gear 13 are transferred to the first gear 14, and transferred to the output differential gear device 18 via the counter shaft 15, the second gear 16, and the differential input gear 17.

The output differential gear device 18 splits the rotational drive force transferred to the differential input gear 17, and transfers the split rotational drive forces to the two wheels W via the output shaft 19. As discussed above, the engine E, the first motor/generator MG1, and the second motor/generator MG2 are connected to the counter speed reduction mechanism C (second gear 16). Thus, the hybrid drive device 1 can transfer the rotational drive force generated by the engine E, the first motor/generator MG1, and the second motor/generator MG2 and transferred to the differential input gear 17 to the two wheels W on the left and the right via the output differential gear device 18 and the output shaft 19 to drive the vehicle.

The control unit 41 is configured to include one or two or more arithmetic processing units, storage media such as a RAM and a ROM that store software (program), data, etc., and so forth. Each functional section of the control unit 41 has an arithmetic processing unit as its core member, and a functional section configured to perform various processes on input data and implemented by hardware, software, or a combination of both. The control unit 41 may be embodied as an EFI ECU that controls the engine E, for example, when mounted on the vehicle. In addition, the control unit 41 may be implemented by a single ECU, or may be implemented by a plurality of ECUs.

The engine E, the first inverter 32 for the first motor/generator MG1, the second inverter 33 for the second motor/generator MG2, and the clutch pressure control actuator 120 are connected to the control unit 41. The control unit 41 controls these components.

An engine rotational speed sensor 90 that detects the engine rotational speed, an oil temperature sensor 92 that detects the oil temperature of the engine E, a vehicle speed sensor 94 that detects the wheel speed, and a current sensor 96 that detects the current value of the first motor/generator MG1 may be connected to the control unit 41. Information from these sensors 90 to 96 is utilized to predict or detect input of torque that is equal to or more than a predetermined threshold to the hybrid drive device 1 as discussed later. Some of the sensors 90 to 96 may be omitted or replaced with other sensors in accordance with the prediction or detection method.

Figure 3:
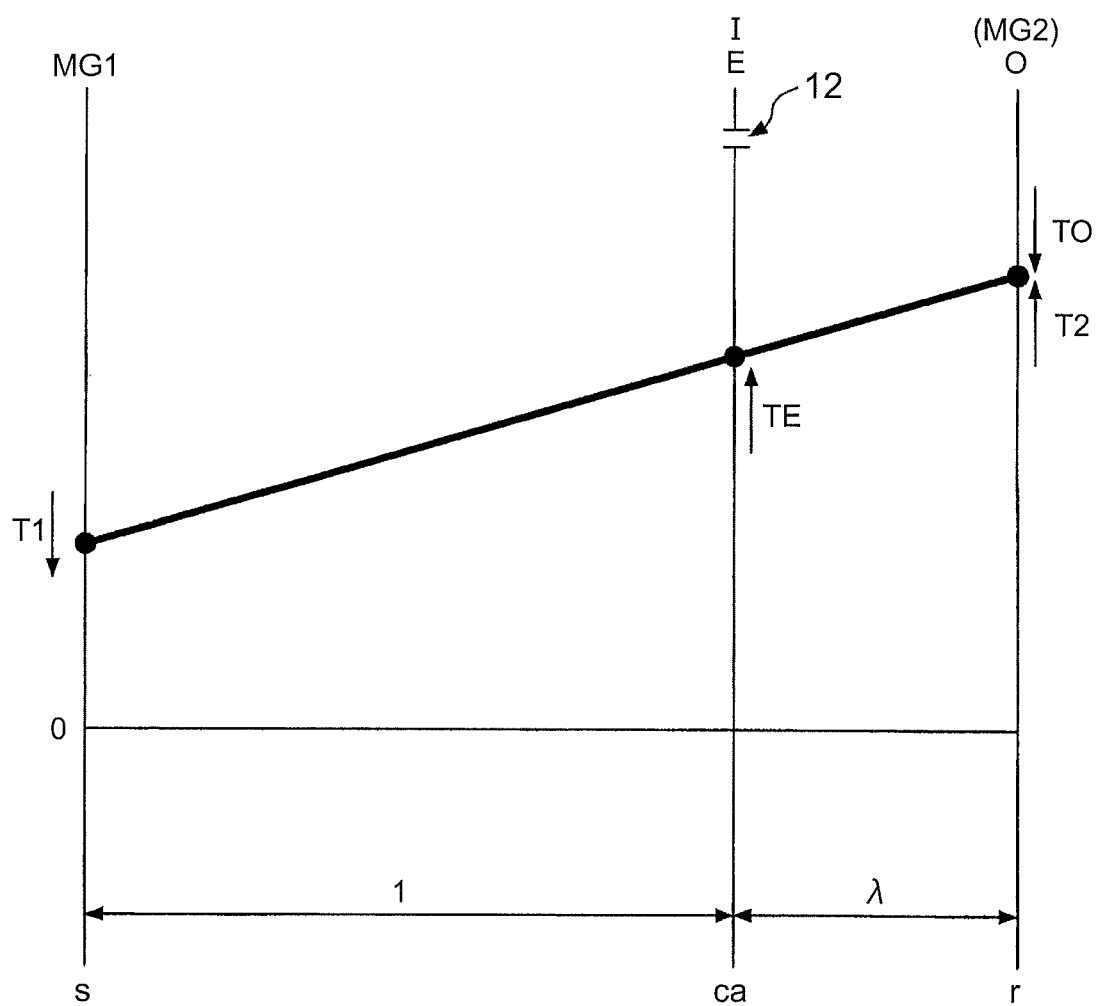
FIG. 3 is a velocity diagram illustrating the operating state of a planetary gear device in a split travel mode.
Figure 4:
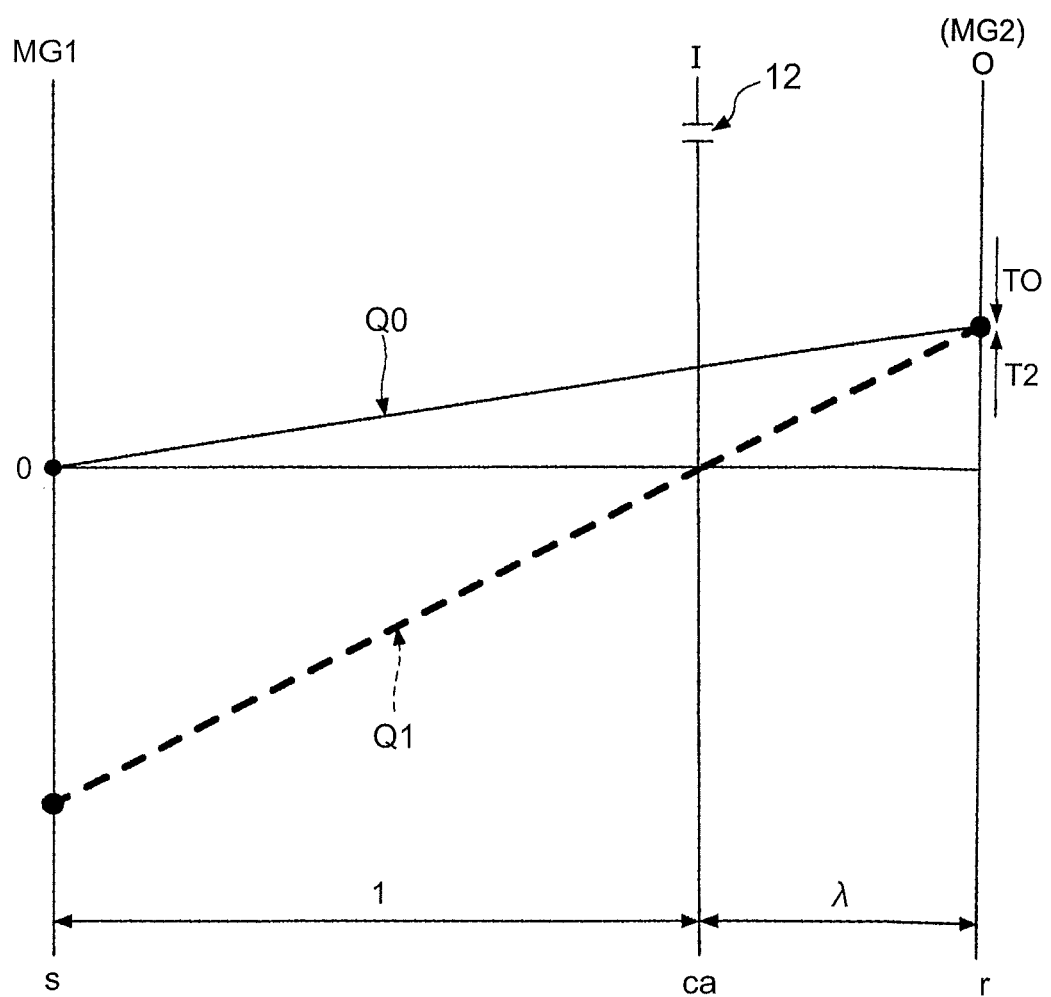
FIG. 4 is a velocity diagram illustrating the operating state of the planetary gear device in an electric travel mode.

The hybrid drive device 1 can be switched between an electric travel mode and a split travel mode. FIGS. 3 and 4 are each a velocity diagram illustrating the operating state of the planetary gear device P in each mode. In the velocity diagrams, the vertical axis corresponds to the rotational speed of each rotary element. That is, the indication "0" provided corresponding to the vertical axis indicates that the rotational speed is zero, with the upper side corresponding to positive rotation (the rotational speed is positive) and the lower side corresponding to negative rotation (the rotational speed is negative). The distance between vertical lines corresponding to the respective rotary elements corresponds to the gear ratio $\lambda$ of the planetary gear device P (the tooth number ratio between the sun gear and the ring gear=[number of teeth of sun gear]/[number of teeth of ring gear]). The plurality of vertical lines disposed in parallel with each other correspond to the respective rotary elements of the planetary gear device P. That is, the symbols "s", "ca", and "r" provided below the vertical lines correspond to the sun gear s, the carrier ca, and the ring gear r, respectively, of the planetary gear device P.

The symbols "E", "I", "MG1", "MG2", and "O" provided above the vertical lines correspond to the engine E, the input shaft I, the first motor/generator MG1, the second motor/generator MG2, and the output gear O, respectively, connected to the rotary elements of the planetary gear device P. For the second motor/generator MG2 and the output gear O, it should be noted that the output gear O rotates at a predetermined speed ratio with respect to the second motor/generator MG2. Therefore, the symbol "MG2" is provided above the vertical line in parentheses. In addition, an arrow provided adjacent to a dot indicating the rotational speed of each rotary element indicates the direction of torque applied to the rotary element during travel in each mode, and an arrow pointing up indicates positive torque (torque in the positive direction) and an arrow pointing down indicates negative torque (torque in the negative direction). The symbol "TE" indicates engine torque TE transferred from the engine E to the carrier ca, "T1" indicates MG1 torque T1 transferred from the first motor/generator MG1 to the sun gear s, "T2" indicates MG2 torque T2 transferred from the second motor/generator MG2 to the ring gear r, and "TO" indicates travel torque TO transferred from the side of the output gear O (wheels W) to the ring gear r. The operating state of the hybrid drive device 1 in each mode will be described below.

In the split travel mode, the control unit 41 controls the clutch 12 into an engaged state. Consequently, the rotational drive force of the engine E is input to the planetary gear device P via the engine output shaft Eo and the input shaft I. In the split travel mode, the rotational drive force of the engine E is, transferred as distributed to the first motor/generator MG1 and the output gear O. That is, in the split travel mode, the planetary gear device P functions to distribute the rotational drive force of the engine E to the first motor/generator MG1 and the output gear O. FIG. 3 is a velocity diagram illustrating the operating state of the planetary gear device P in the split travel mode. As illustrated in the drawing, the planetary gear device P is configured such that the carrier ca, which is at the middle in the order of rotational speed, rotates together with the engine E. Rotation of the carrier ca is distributed to the sun gear s, which is at one end in the order of rotational speed, and the ring gear r, which is at the other end in the order of rotational speed. Rotation distributed to the sun gear s is transferred to the first motor/generator MG1. The rotational drive force distributed to the ring gear r is transferred to the wheels W via the output gear O.

When the vehicle is traveling normally in the split travel mode, as illustrated in FIG. 3, the engine E outputs the engine torque TE in the positive direction matching the control command from the control unit 41 while being controlled so as to be maintained in a state with high efficiency and low gas emission (in general, so as to follow optimum fuel efficiency characteristics), and the engine torque TE is transferred to the carrier ca via the input shaft I. On the other hand, the first motor/generator MG1 outputs the MG1 torque T1 in the negative direction. That is, the first motor/generator MG1 functions to receive a reaction force of the engine torque TE, which allows the engine torque TE to be distributed to the ring gear r on the side of the output gear O.

When the vehicle is traveling normally in the split travel mode, the first motor/generator MG1 generates electric power by generating torque in the negative direction while making positive rotation. The second motor/generator MG2 consumes electric power generated by the first motor/generator MG1 to perform power running, and outputs the MG2 torque T2 in the positive direction to supplement the engine torque TE to be transferred to the output gear O. When the vehicle is decelerating, the second motor/generator MG2 generates electric power by outputting torque in the negative direction while making positive rotation to perform regenerative braking.

In the electric travel mode, the control unit 41 controls the clutch 12 into a disengaged state. Consequently, the engine E and the input shaft I are disconnected from each other. In the electric travel mode, only the rotational drive force of the second motor/generator MG2 serving as a drive force source for the vehicle is transferred to the wheels W. That is, the electric travel mode is basically a mode in which electric power of the battery 31 is consumed to drive the vehicle using only the rotational drive force of the second motor/generator MG2. In the electric travel mode, the second motor/generator MG2 is controlled so as to output an appropriate rotational speed and the MG2 torque T2 in accordance with vehicle-required torque decided on the basis of the vehicle speed, the throttle opening, and so forth. That is, in the case where a drive force in the direction of accelerating the vehicle or causing the vehicle to cruise is required, the second motor/generator MG2 outputs the MG2 torque T2 in the positive direction while rotating in the positive direction to perform power running in order to accelerate the vehicle against the travel torque TO corresponding to a travel resistance that acts on the output gear O in the negative direction. In the case where a drive force in the direction of decelerating the vehicle is required, on the other hand, the second motor/generator MG2 outputs the MG2 torque T2 in the negative direction while rotating in the positive direction to perform regeneration (electric power generation) in order to decelerate the vehicle against the travel torque TO corresponding to an inertial force of the vehicle that acts on the output gear O in the positive direction. The electric travel mode is also used when the vehicle is driven rearward. In this case, the rotational direction of the second motor/generator MG2 and the direction of the MG2 torque T2 are opposite to those described above.

In the electric travel mode, as discussed above, the clutch 12 is brought into the disengaged state, which disconnects the engine E from the carrier ca of the planetary gear device P and the input shaft I. Therefore, in FIG. 4, not the symbol "E" corresponding to the engine E but only the symbol "I" corresponding to the input shaft I is provided above the vertical line indicating the carrier ca. The carrier ca rotates at a rotational speed decided on the basis of the rotational speed of the ring gear r, which is decided in proportion to the vehicle speed, and the rotational speed (around zero) of the sun gear s, which is equal to the rotational speed of the first motor/generator MG1. That is, as indicated by the thin solid line Q0 in FIG. 4, the sun gear s and the first motor/generator MG1 do not rotate, and the carrier ca rotates in accordance with rotation of the ring gear r.

The thick broken line Q1 in FIG. 4 is a line for a comparative example in which the clutch 12 is brought into the engaged state in the electric travel mode. That is, the thick broken line Q1 in FIG. 4 is a line for a comparative example in which the clutch 12 is not provided. In the comparative example, in the electric travel mode, the input shaft I and the carrier ca are not rotated, and the sun gear s and the first motor/generator MG1 are rotated. This is because torque required to rotate the input shaft I and the carrier ca is significantly larger than torque required to rotate the sun gear s and the first motor/generator MG1 since the engine output shaft Eo of the engine E is connected to the input shaft I. In the comparative example, in the electric travel mode, the sun gear s and the first motor/generator MG1 (first rotor Ro1), of which a loss during rotation is significantly larger than that for the input shaft I and the carrier ca, are rotated, and thus the fuel efficiency (electric mileage) is disadvantageously degraded. In contrast, in the embodiment, as discussed above, in the electric travel mode, the clutch 12 is brought into the disengaged state. Thus, the input shaft I and the carrier ca, of which a loss during rotation is significantly smaller than that for the sun gear s and the first motor/generator MG1, are rotated, and thus the fuel efficiency (electric mileage) is accordingly improved compared to the comparative example.

In the electric travel mode, the control unit 41 brings the clutch 12 into the disengaged state, and the engine E is stationary. During travel in the electric travel mode (while the engine E is stationary), switching from the electric travel mode to the split travel mode is made by switching the clutch 12 from the disengaged state to the engaged state and starting the engine E using the rotational drive force of the first motor/generator MG1.

In the split travel mode, on the other hand, the control unit 41 brings the clutch 12 into the engaged state, and the engine E, the engine output shaft Eo, and the input shaft I are rotated together with each other. During travel in the split travel mode, switching from the split travel mode to the electric travel mode is made by switching the clutch 12 from the engaged state to the disengaged state and causing the second motor/generator MG2 to output the vehicle required torque required to drive the vehicle.

Figure 5:
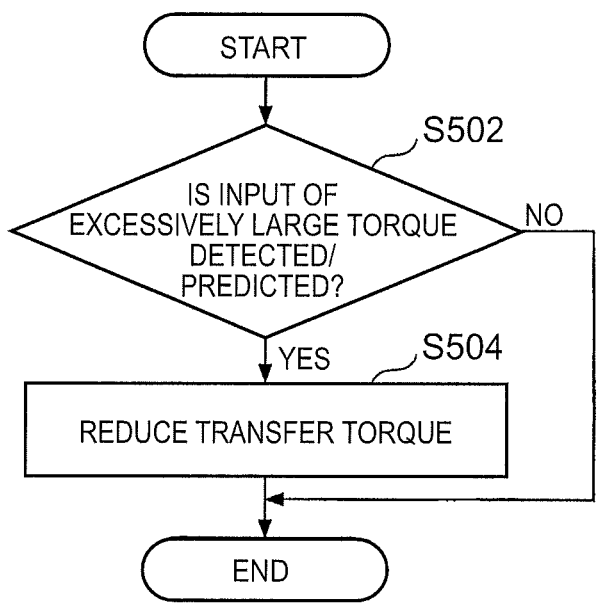
FIG. 5 is a flowchart illustrating an example of a main process executed by a control unit 41.

FIG. 5 is a flowchart illustrating an example of a main process executed by the control unit 41.

In step 502, it is determined whether or not input of torque that is equal to or more than a predetermined threshold to the drive transfer mechanism (built-in parts) of the hybrid drive device 1 is predicted or detected. Torque that is equal to or more than a predetermined threshold may include input from the outside via the wheels W and input from the engine E. The predetermined threshold corresponds to maximum allowable torque that may be transferred to the drive transfer mechanism of the hybrid drive device 1 (or a value with a margin from the maximum allowable torque), and may be determined from the strength and the rigidity of the various portions of the drive transfer mechanism of the hybrid drive device 1, the required durability, or the like.

There are a diversity of methods of predicting or detecting input of torque that is equal to or more than the predetermined threshold, and any of such methods may be used. In general, the magnitude of torque input to the drive transfer mechanism of the hybrid drive device 1 cannot be measured directly, and therefore is predicted or detected indirectly. It should be noted, however, that a distortion sensor may be attached to an element of the drive transfer mechanism of the hybrid drive device 1 to detect input torque.

Typically, torque that is equal to or more than the predetermined threshold tends to be input during travel on a bad road such as a wavy road. Thus, it may be determined that input of torque that is equal to or more than the predetermined threshold is predicted or detected in the case where travel of the vehicle on a bad road is predicted or detected. Travel of the vehicle on a bad road may be predicted or detected on the basis of information from a navigation device, vertical acceleration detected by an in-vehicle acceleration sensor, the results of image recognition performed using an in-vehicle camera, or the like. In addition, torque that is equal to or more than the predetermined threshold tends to be input during engine starting in a low temperature environment. This is because in the low temperature environment, the engine output shaft Eo of the engine E stays at a resonance point for a long time (resonance time), and relatively large torque is generated continuously through resonance. Besides the oil temperature sensor 92, the low temperature environment may be detected utilizing other sensors (not illustrated) such as an outside air temperature sensor or an engine coolant temperature sensor, external information (for example, weather information acquired through communication), or the like. Thus, it may be determined that input of torque that is equal to or more than the predetermined threshold is predicted or detected in the case where engine starting in the low temperature environment is predicted or detected. Several specific examples of such determination methods will be discussed later with reference to FIGS. 6 to 8. In the case where input of torque that is equal to or more than the predetermined threshold is predicted or detected in step 502, the process proceeds to step 504. In other cases, the process in the current cycle is ended. In this case, transfer torque of the clutch 12 is maintained at a normal value. Here, the normal value may correspond to transfer torque of the clutch 12 in the split travel mode (that is, with the clutch 12 in the engaged state), and may correspond to the maximum value within a variable range of transfer torque of the clutch 12, for example.

In step 504, transfer torque of the clutch 12 is reduced. Transfer torque of the clutch 12 is reduced to a predetermined value Tc (>0) that is smaller than the normal value, for example. The predetermined value Tc may correspond to minimum torque that does not obstruct engine starting, travel on a bad road, or the like, for example, and may be adapted through a test or the like. Specifically, the control unit 41 controls the rotational position of the lever 124 via the clutch pressure control actuator 120 such that transfer torque between the clutch cover 121 and the clutch disk 122 reaches the predetermined value Tc.

According to the embodiment, transfer torque (limit torque) of the clutch 12 can be optimized in accordance with the situation. This eliminates the need to increase the size of the drive transfer mechanism of the hybrid drive device 1 (increase the torque capacity) in order to support input of excessively large torque. Thus, it is possible to improve the fuel efficiency of the hybrid vehicle by reducing the weight of the drive transfer mechanism of the hybrid drive device 1.

Figure 6:
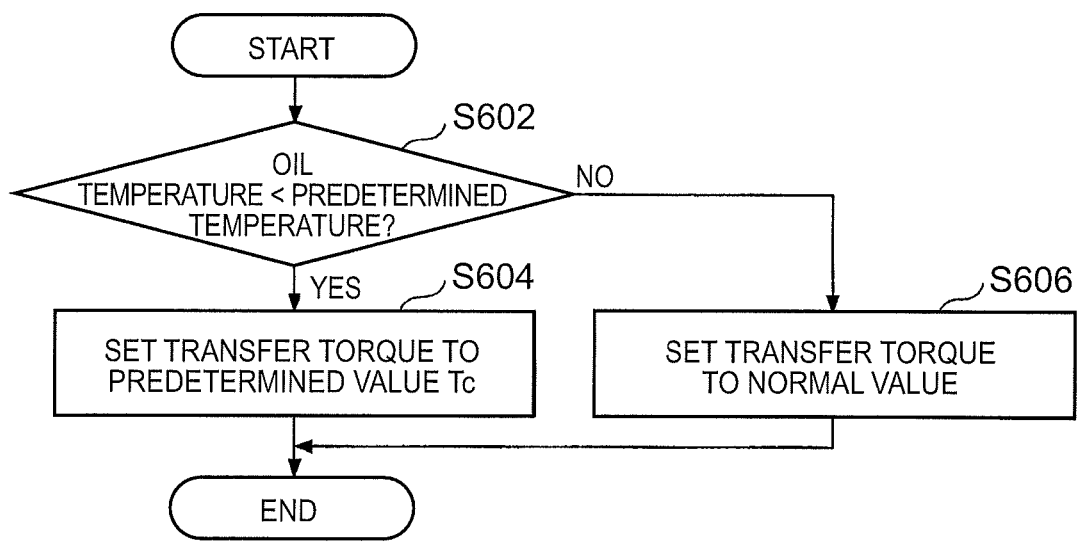
FIG. 6 is a flowchart illustrating a specific example of the process illustrated in FIG. 5.

FIG. 6 is a flowchart illustrating a specific example of the process illustrated in FIG. 5. The process routine illustrated in FIG. 6 is started and executed in the case where an engine starting request is made with the engine E stationary. The engine starting request may be made when power supply of the vehicle is turned on, or may be made because of a torque request in the electric travel mode.

In step 602, it is determined whether or not the oil temperature of the engine E detected by the oil temperature sensor 92 is lower than a predetermined temperature. The predetermined temperature is a temperature that indicates the low temperature environment in which the engine output shaft Eo stays at a resonance point for a long time during engine starting, and may be adapted through a test or the like. For example, the predetermined temperature may be −20° C. In the case where the oil temperature of the engine E is lower than the predetermined temperature, the process proceeds to step 604. In other cases, (that is, in the case where the oil temperature of the engine E is not lower than the predetermined temperature) the process proceeds to step 606.

In step 604, transfer torque of the clutch 12 is set to a predetermined value Tc1 (>0) that is smaller than the normal value. Specifically, the control unit 41 controls the rotational position of the lever 124 via the clutch pressure control actuator 120 such that transfer torque between the clutch cover 121 and the clutch disk 122 reaches the predetermined value Tc1. In this case, subsequent engine starting is executed with transfer torque of the clutch 12 at the predetermined value Tc1. Consequently, excessively large torque (torque that is equal to or more than the predetermined value Tel) is not transferred even if the engine output shaft Eo resonates during engine starting in an environment in which the oil temperature of the engine E is lower than the predetermined temperature, which protects the drive transfer mechanism of the hybrid drive device 1 from excessively large torque. The predetermined value Tc1 is set within a range in which torque required for engine starting is secured. When starting of the engine E is finished (for example, the engine rotational speed is raised to an idle rotational speed), transfer torque of the clutch 12 may be changed from the predetermined value Tc1 to the normal value.

In step 606, transfer torque of the clutch 12 is set to the normal value. Specifically, the control unit 41 controls the rotational position of the lever 124 via the clutch pressure control actuator 120 such that transfer torque between the clutch cover 121 and the clutch disk 122 reaches the normal value. In this case, subsequent engine starting is executed with transfer torque of the clutch 12 at the normal value. During engine starting, the engine output shaft Eo passes by its resonance point. In a non-low temperature environment, however, the time required to pass by the resonance point is significantly short, and does not substantially affect the durability of the drive transfer mechanism of the hybrid drive device 1. Transfer torque of the clutch 12 set to the normal value in this way may be maintained thereafter during continuation of the split travel mode.

According to the process illustrated in FIG. 6, in an environment in which the oil temperature of the engine E is lower than a predetermined temperature, engine starting is performed with transfer torque of the clutch 12 reduced to the predetermined value Tc1 which is smaller than the normal value. Thus, the drive transfer mechanism of the hybrid drive device 1 can be protected from excessively large torque during resonance even if resonance during engine starting is continued for a long time because of the low temperature environment.

Figure 7:
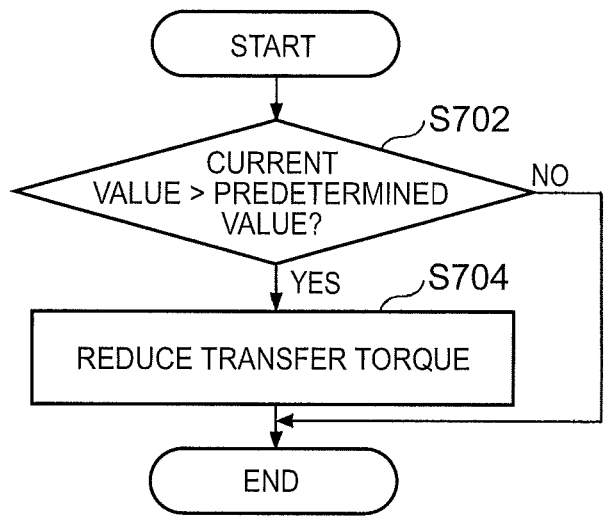
FIG. 7 is a flowchart illustrating another specific example of the process illustrated in FIG. 5.

FIG. 7 is a flowchart illustrating another specific example of the process illustrated in FIG. 5. The process routine illustrated in FIG. 7 may be executed repeatedly at predetermined intervals while transfer torque of the clutch 12 is maintained at the normal value in the split travel mode.

In step 702, it is determined whether or not the current value of the first motor/generator MG1 detected by the current sensor 96 is more than a predetermined value. The predetermined value may correspond to a minimum value (or a value with a margin from the minimum value) in a range in which the current value may fall when the maximum allowable torque is input to the drive transfer mechanism of the hybrid drive device 1, and may be adapted through a test or the like. Alternatively, the predetermined value may correspond to a maximum current value determined by the rating of the first motor/generator MG1. For example, the predetermined value may be 80 Arms. When input torque from the wheels W to the drive transfer mechanism of the hybrid drive device 1 is excessively large during travel on a bad road or the like, the first motor/generator MG1 is controlled so as to generate torque in the direction of canceling such input torque, which increases the current value of the first motor/generator MG1. In the case where the current value is more than the predetermined value in step 702, the process proceeds to step 704. In other cases (that is, in the case where the current value is not more than the predetermined value), the process is terminated. Thus, in this case, transfer torque of the clutch 12 is maintained at the normal value.

In step 704, transfer torque of the clutch 12 is reduced. Transfer torque of the clutch 12 is reduced to a predetermined value Tc2 (>0) that is smaller than the normal value, for example. The predetermined value Tc2 may correspond to minimum torque that does not obstruct travel on a bad road or the like (torque in a range in which the drivability is not excessively affected), and may be adapted through a test or the like. Specifically, the control unit 41 controls the rotational position of the lever 124 via the clutch pressure control actuator 120 such that transfer torque between the clutch cover 121 and the clutch disk 122 reaches the predetermined value Tc2. Transfer torque of the clutch 12 reduced to the predetermined value Tc2 in this way may be maintained thereafter until predetermined ending conditions are met. The predetermined ending conditions may be determined as desired, and may be met when a predetermined time elapses, for example.

According to the process illustrated in FIG. 7, in an environment in which excessively large torque with which the current value of the first motor/generator MG1 is more than a predetermined value is input (in particular, in an environment of travel on a bad road), transfer torque of the clutch 12 is reduced to the predetermined value Tc2 which is smaller than the normal value. Thus, even if excessively large torque is continuously input thereafter, the drive transfer mechanism of the hybrid drive device 1 can be protected from such excessively large torque, which improves the durability of the drive transfer mechanism of the hybrid drive device 1.

In the process illustrated in FIG. 7, the current value of the first motor/generator MG1 is monitored. However, a voltage value may be utilized in place of the current value of the first motor/generator MG1. In addition, in consideration of a fact that the current value of the first motor/generator MG1 pulsates during travel on a bad road such as a wavy road, transfer torque of the clutch 12 may be reduced to the predetermined value Tc2 in the case where such pulsation is detected.

In addition, the process illustrated in FIG. 7 may be executed in combination with the process illustrated in FIG. 6 discussed above. That is, because these processes are executed in different situations (the process illustrated in FIG. 6 is executed when an engine starting request is made with the engine stationary, and the process illustrated in FIG. 7 is executed in the split travel state), the processes may be executed in the respective situations.

Figure 8:
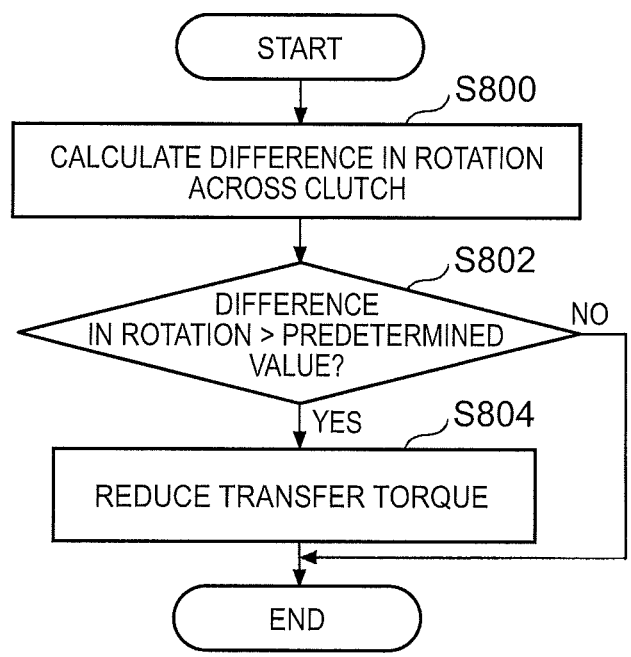
FIG. 8 is a flowchart illustrating still another specific example of the process illustrated in FIG. 5.

FIG. 8 is a flowchart illustrating still another specific example of the process illustrated in FIG. 5. The process routine illustrated in FIG. 8 may be executed repeatedly at predetermined intervals while transfer torque of the clutch 12 is maintained at the normal value in the split travel mode.

In step 800, a difference in rotation across the clutch 12 is calculated. That is, the difference in rotational speed between the engine output shaft Eo on the input side of the clutch 12 and the input shaft I on the output side of the clutch 12 is calculated. The rotational speed of the engine output shaft Eo on the input side of the clutch 12 may be obtained on the basis of information from the engine rotational speed sensor 90. The rotational speed of the input shaft I may be calculated on the basis of information from the vehicle speed sensor 94. Alternatively, in the case where a rotational speed sensor (for example, a rotational speed sensor that detects the rotational speed of the first motor/generator MG1) is provided at another element of the hybrid drive device 1, the rotational speed of the input shaft I may be calculated on the basis of information from the rotational speed sensor. The difference in rotation across the clutch 12 is an indicator that indicates the degree of slipping of the clutch 12.

In step 802, it is determined whether or not the difference in rotation calculated in step 800 is more than a predetermined value. The predetermined value may correspond to a minimum value (or a value with a margin from the minimum value) in a range in which the difference in rotation may fall when the maximum allowable torque is input to the drive transfer mechanism of the hybrid drive device 1, and may be adapted through a test or the like. For example, the predetermined value may be 100 ppm. In the case where the difference in rotation is more than the predetermined value, the process proceeds to step 804. In other cases (that is, in the case where the difference in rotation is not more than the predetermined value), the process is terminated. Thus, in this case, transfer torque of the clutch 12 is maintained at the normal value.

In step 804, transfer torque of the clutch 12 is reduced. As in the process in step 704 of FIG. 7, transfer torque of the clutch 12 is reduced to a predetermined value Tc2 (>0) that is smaller than the normal value, for example. Transfer torque of the clutch 12 reduced to the predetermined value Tc2 in this way may be maintained thereafter until predetermined ending conditions are met. The predetermined ending conditions may be determined as desired, and may be met when a predetermined time elapses, for example.

According to the process illustrated in FIG. 8, in an environment in which excessively large torque with which the difference in rotation across the clutch 12 is more than a predetermined value is input (in particular, in an environment of travel on a bad road), transfer torque of the clutch 12 is reduced to the predetermined value Tc2 which is smaller than the normal value. Thus, even if excessively large torque is continuously input thereafter, the drive transfer mechanism of the hybrid drive device 1 can be protected from such excessively large torque, which improves the durability of the drive transfer mechanism of the hybrid drive device 1.

The process illustrated in FIG. 8 may be executed in combination with the process illustrated in FIG. 6 discussed above. That is, because these processes are executed in different situations (the process illustrated in FIG. 6 is executed when an engine starting request is made with the engine stationary, and the process illustrated in FIG. 8 is executed in the split travel state), the processes may be executed in the respective situations. In addition, the process illustrated in FIG. 8 may be executed in combination with the process illustrated in FIG. 7 discussed above. In this case, transfer torque of the clutch 12 may be reduced to the predetermined value Tc2 in the case where any of the conditions in step 702 and step 802 is met, or in the case where both of the conditions are met.

Figure 9:
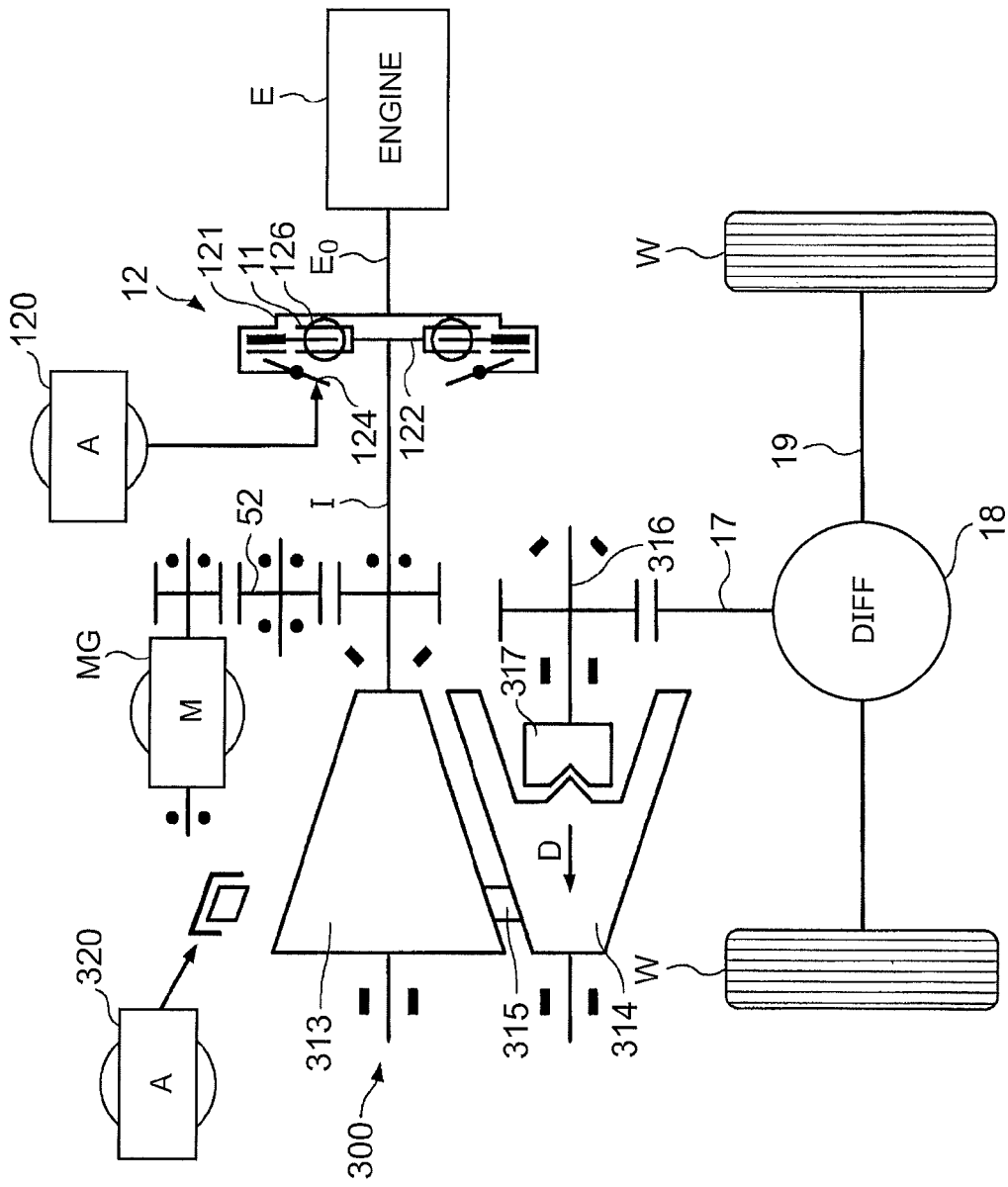
FIG. 9 is a skeleton diagram illustrating the configuration of a hybrid drive device 2 according to another embodiment (second embodiment).

FIG. 9 is a skeleton diagram illustrating the configuration of a hybrid drive device 2 according to another embodiment (second embodiment). The hybrid drive device 2 according to the embodiment is different from the hybrid drive device 1 according to the first embodiment discussed above mainly in including a motor/generator MG and a cone-ring continuously variable transmission (friction continuously variable transmission) 300 in place of the first motor/generator MG1, the second motor/generator MG2, the planetary gear device P, and the counter speed reduction mechanism C provided in the hybrid drive device 1. In the following description, components that are peculiar to the second embodiment will be mainly described, and components that may be the same as those according to the first embodiment discussed above are given the same reference numerals to omit their descriptions.

A motor output shaft of the motor/generator MG is connected to the input shaft I via a gear 52. As in the first embodiment discussed above, the input shaft I is connected to the engine E via the clutch 12. The cone-ring continuously variable transmission 300 includes a friction wheel (primary cone) 313 that has a conical shape and that serves as a friction input portion, a friction wheel (secondary cone) 314 that has a conical shape and that serves as a friction output portion, and a ring (friction ring) 315 made of metal. The friction wheels 313 and 314 are disposed in parallel with each other and with their respective large diameter portions and small diameter portions disposed opposite to each other in the axial direction. The ring 315 is disposed so as to be held between respective inclined surfaces of the friction wheels 313 and 314, which face each other, and so as to surround one of the friction wheels (for example, the input-side friction wheel 313). A pressing mechanism (cam mechanism) 317 having a wavy cam surface as a surface facing the output-side friction wheel 314 in the axial direction is provided between the output-side friction wheel 314 and an output shaft 316. The pressing mechanism 317 provides the output-side friction wheel 314 with a thrust force in the direction of the arrow D matching transfer torque. A large compression force is generated on the ring 315 between the output-side friction wheel 314 and the input-side friction wheel 313 which is supported in the direction opposite to the thrust force. The ring 315 is moved in the axial direction by an electric actuator 320 such as a ball screw rotationally driven by a motor to change the position of contact between the input-side friction wheel 313 and the output-side friction wheel 314 to continuously vary the rotational ratio between the input-side friction wheel 313 and the output-side friction wheel 314. The rotational drive force of the output-side friction wheel 314 which has been continuously varied in speed is transferred from the output shaft 316, which is drivably coupled to the output-side friction wheel 314 through the pressing mechanism 317 etc., to the differential input gear 17. The output differential gear device 18 splits the rotational drive force transferred to the differential input gear 17, and transfers the split rotational drive forces to the two wheels W via the output shaft 19.

The rotational drive force of the motor/generator MG is transferred to the input shaft I via the gear 52 etc. The rotational drive force of the input shaft I transferred from the motor/generator MG is likewise continuously varied in speed via the cone-ring continuously variable transmission 300, and further transferred from the output shaft 316 to the differential input gear 17. The output differential gear device 18 splits the rotational drive force transferred to the differential input gear 17, and transfers the split rotational drive forces to the two wheels W via the output shaft 19.

The hybrid drive device 2 includes a control unit (not illustrated) that is similar to the control unit 41 according to the first embodiment discussed above, and the method for the control unit to control the clutch 12 (in particular, the method described with reference to FIGS. 5 to 8) may be the same as that according to the first embodiment discussed above. For FIG. 7, the current value of the motor/generator MG may be monitored in place of the current value of the first motor/generator MG1.

Figure 10:
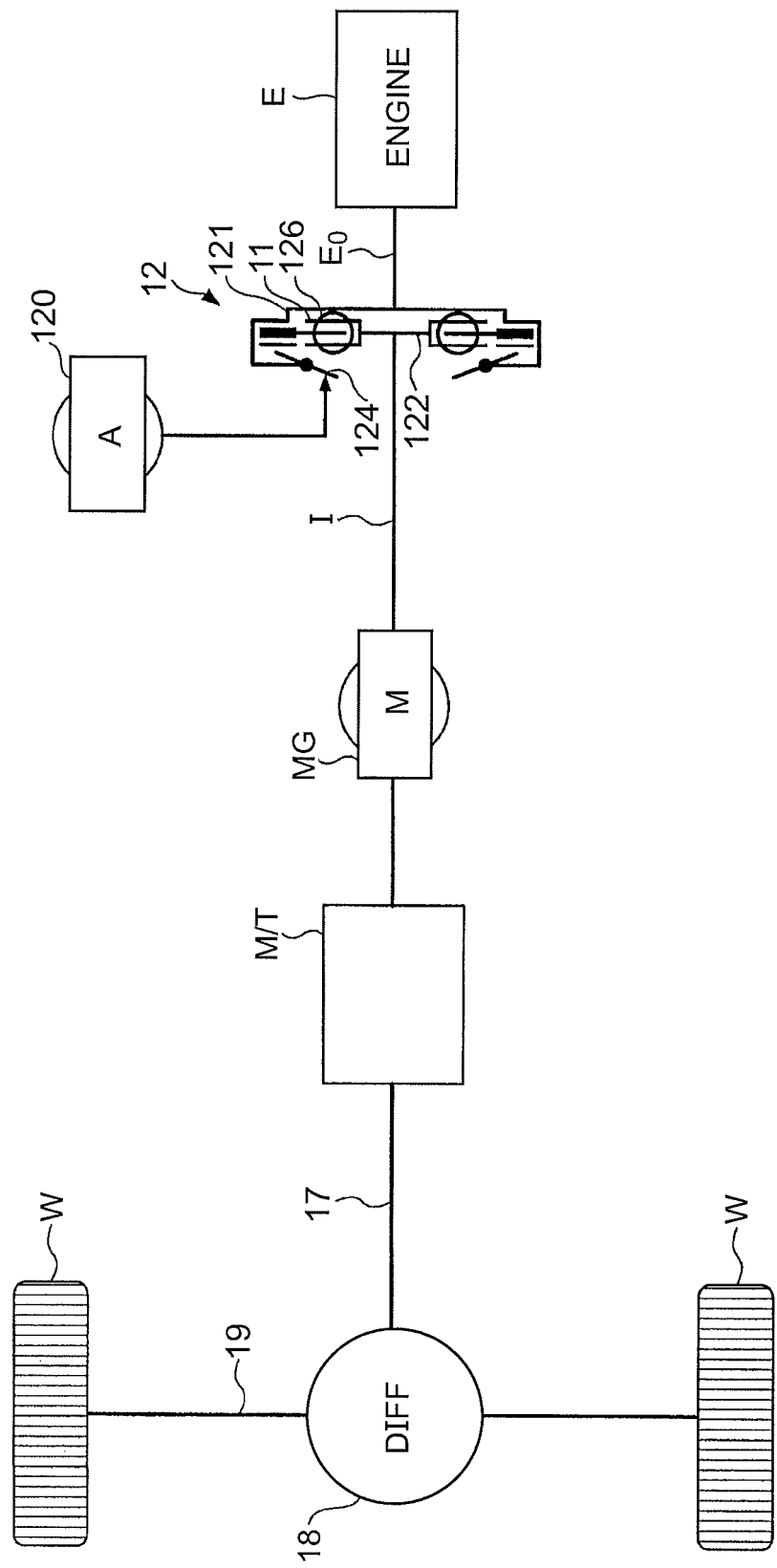
FIG. 10 is a schematic diagram illustrating the configuration of a hybrid drive device 3 according to still another embodiment (third embodiment).

FIG. 10 is a schematic diagram illustrating the configuration of a hybrid drive device 3 according to still another embodiment (third embodiment). The hybrid drive device 3 according to the third embodiment is mainly characterized by including a manual transmission M/T. In the following description, components that are peculiar to the third embodiment will be mainly described, and components that may be the same as those according to the first embodiment discussed above are given the same reference numerals to omit their descriptions.

The motor/generator MG is connected to the input shaft I. As in the first embodiment discussed above, the input shaft I is connected to the engine E via the clutch 12. The motor/generator MG may be connected to the input shaft I via a gear. The manual transmission M/T includes a built-in meshing clutch, and is provided on the output side of the motor/generator MG. The output side of the manual transmission M/T is connected to the two wheels W via the output differential gear device 18 etc. The motor/generator MG may be disposed on the output side of the manual transmission M/T.

Figure 11:
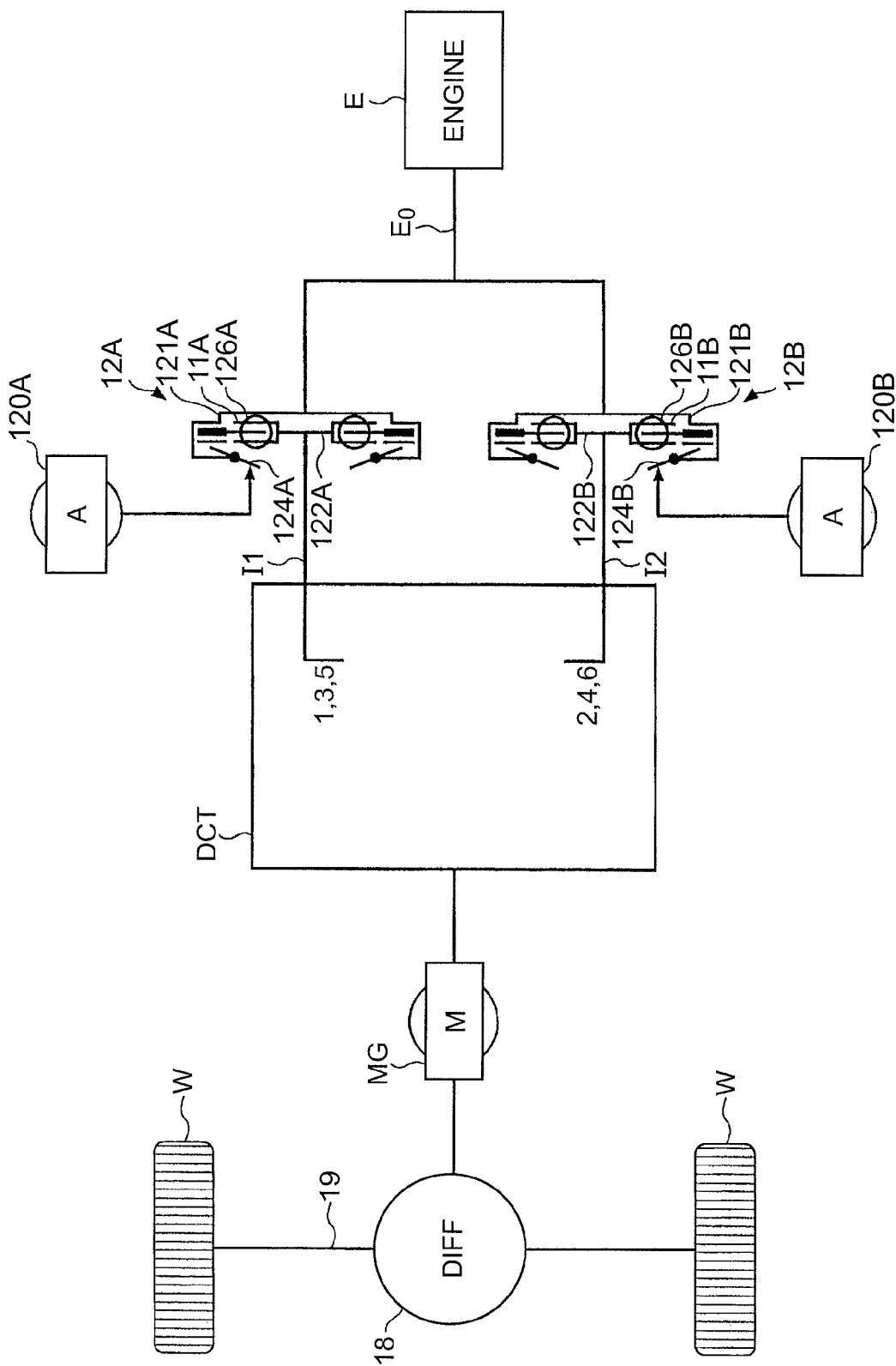
FIG. 11 is a schematic diagram illustrating the configuration of a hybrid drive device 4 according to yet another embodiment (fourth embodiment).

The hybrid drive device 3 includes a control unit (not illustrated) that is similar to the control unit 41 according to the first embodiment discussed above, and the method for controlling the clutch 12 with the control unit (in particular, the method described with reference to FIGS. 5 to 8) may be the same as that according to the first embodiment discussed above. For FIG. 7, the current value of the motor/generator MG may be monitored in place of the current value of the first motor/generator MG1, FIG. 11 is a schematic diagram illustrating the configuration of a hybrid drive device 4 according to yet another embodiment (fourth embodiment). The hybrid drive device 4 according to the fourth embodiment is mainly characterized by including a dual clutch transmission DCT. In the following description, components that are peculiar to the fourth embodiment will be mainly described, and components that may be the same as those according to the first embodiment discussed above are given the same reference numerals to omit their descriptions.

The dual clutch transmission DCT has therein two systems of meshing clutches that are each similar to that of the manual transmission M/T for odd-numbered shift speeds (for example, first, third, and fifth speeds) and even-numbered shift speeds (for example, second, fourth, and sixth speeds). Accordingly, two systems of input shafts I1 and I2 are connected to the dual clutch transmission DCT. The input shafts I1 and I2 are connected to the engine output shaft Eo via clutches 12A and 12B, respectively. The clutches 12A and 12B are driven by clutch pressure control actuators 120A and 120B, respectively. The configuration of each of the clutches 12A and 12B may be the same as that of the clutch 12 according to the first embodiment discussed above. The configuration of each of the clutch pressure control actuators 120A and 120B may be the same as that of the clutch pressure control actuator 120 according to the first embodiment discussed above.

The motor/generator MG is connected to the output side of the dual clutch transmission DCT. The motor/generator MG may be connected to the output side of the dual clutch transmission DCT via a gear. The output side of the motor/generator MG is connected to the two wheels W via the output differential gear device 18 etc. The motor/generator MG may be disposed on the input side of the dual clutch transmission DCT. That is, the motor/generator MG may be provided for each of the input shafts I1 and I2.

The hybrid drive device 4 includes a control unit (not illustrated) that is similar to the control unit 41 according to the first embodiment discussed above, and the method for controlling the clutches 12A and 12B with the control unit (in particular, the method described with reference to FIGS. 5 to 8) may be the same as that according to the first embodiment discussed above. In controlling the clutches 12A and 12B, transfer torque of one of the clutches 12A and 12B for the system currently outputting a drive force may be reduced. For FIG. 7, the current value of the motor/generator MG may be monitored in place of the current value of the first motor/generator MG1.

As is clear from the second, third, and fourth embodiments discussed above, the present invention may be applied to any configuration in which a second friction engagement element other than the clutch 12 is not provided between the clutch cover 121 (input element) of the clutch 12 and the engine E or between the clutch disk 122 (output element) of the clutch 12 and the wheels W. As a matter of course, the friction engagement element does not include an engagement element or a meshing clutch (dog clutch) in a continuously variable transmission (CVT).

Although various embodiments have been discussed in detail above, the present invention is not limited to specific embodiments, and a variety of modifications and changes may be made without departing from the scope of the claims. In addition, all or a plurality of the constituent elements according to the embodiments discussed earlier may be combined with each other.

For example, in each of the embodiments discussed above, the clutch 12 may be a wet multi-plate clutch that operates on a hydraulic pressure. In this case, transfer torque of the clutch 12 may be varied by controlling the amount of oil supplied from an oil pump to the clutch 12. In addition, the clutch 12 may be an electromagnetic clutch controlled in accordance with an electromagnetic force.

Although the clutch 12 is disposed between the engine output shaft Eo and the input shaft I in the first embodiment discussed above, the clutch 12 may be disposed at a different position. For example, the clutch 12 may be disposed between the first motor/generator MG1 and the sun gear s of the planetary gear device P. This is also the case with the other embodiments, and the clutch 12 may be disposed at any location between the engine output shaft Eo and the wheels W.

Although the clutch 12 is brought into the disengaged state in the electric travel mode in the embodiments discussed above, the clutch 12 may be a clutch that is maintained in the engaged state (or an intermediate state) in the electric travel mode. In this case, the processes in FIGS. 6 to 8 may be executed in the electric travel mode.

In the first embodiment discussed above, the mechanical configuration, the electric system configuration, and so forth of the various portions of the hybrid drive device 1 are described with reference to FIGS. 1, 2, and so forth. However, such configurations may be changed in a variety of forms. In particular, there are a wide variety of modes of connection among the first motor/generator MG1, the engine E, and the second motor/generator MG2, and the present invention may be applied to such a diversity of connection modes. The planetary gear device P may not be a single-pinion planetary gear device, and may be a double-pinion or Ravigneaux planetary gear device, for example. The hybrid drive device 1 may include a speed change device with two or more shift speeds that changes the speed of output of the second motor/generator MG2, or output of the engine E and output of the second motor/generator MG2 (total output).

In the second embodiment discussed above, the mechanical configuration etc. of the various portions of the hybrid drive device 2 are described with reference to FIG. 9. However, such a configuration may be changed in a variety of forms. For example, the continuously variable transmission may not be a cone-ring continuously variable transmission.

The present international application claims priority to Japanese Patent Application No. 2012-044855 filed Feb. 29, 2012, the entire contents of which are incorporated herein by reference.

DESCRIPTION OF THE REFERENCE NUMERALS

1, 2, 3, 4 HYBRID DRIVE DEVICE
12 CLUTCH
41 CONTROL UNIT
120 CLUTCH PRESSURE CONTROL ACTUATOR
E ENGINE
I INPUT SHAFT
MG1 FIRST MOTOR/GENERATOR
MG2 SECOND MOTOR/GENERATOR
P PLANETARY GEAR DEVICE
s SUN GEAR
ca CARRIER
r RING GEAR
W WHEEL

The invention claimed is:

1. A hybrid drive device comprising:
   an input shaft configured to be connected to an engine;
   an output shaft configured to be connected to wheels;
   a wheel drive motor connected between the input shaft and the output shaft;
   a friction engagement element configured with an input element connected to the input shaft and an output element, the friction engagement element configured with an adjustable transfer torque;
   a control device configured to adjust the transfer torque of the friction engagement element;
   a second motor that is different from the wheel drive motor; and
   a planetary gear device that includes at least three rotary elements including a first rotary element, a second rotary element, and a third rotary element with no other rotary element provided therebetween,
   wherein the control device reduces the transfer torque of the friction engagement element during engine starting in a predetermined low temperature environment compared to the transfer torque of the friction engagement element in an engaged state, and
   (i) the second motor is drivably coupled to the first rotary element,
   (ii) the output element of the friction engagement element is drivably coupled to the second rotary element, and
   (iii) the output shaft and the wheel drive motor are drivably coupled to the third rotary element.

2. The hybrid drive device according to claim 1, wherein:
   a second friction engagement element is not provided between the input element of the friction engagement element and the engine or between the output element of the friction engagement element and the wheels.

3. The hybrid drive device according to claim 1, wherein the control device reduces the transfer torque of the friction engagement element to predetermined transfer torque that is smaller than a maximum value in a variable range of the transfer torque of the friction engagement element and that enables engine starting.

4. The hybrid drive device according to claim 1, wherein the control device reduces the transfer torque of the friction engagement element to predetermined transfer torque that is smaller than a maximum value in a variable range of the transfer torque of the friction engagement element and that enables travel on a bad road.

5. The hybrid drive device according to claim 1, wherein the control device is configured to determine that the engine is started in the low temperature environment when an oil temperature of the engine is lower than a predetermined temperature.

* * * * *